(12) United States Patent
Ohkubo (10) Patent No.: US 6,668,077 B1
(45) Date of Patent: Dec. 23, 2003

(54) COLOR CORRECTING RELATION EXTRACTING METHOD AND COLOR CORRECTION METHOD

(75) Inventor: Akito Ohkubo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 691 days.

(21) Appl. No.: 09/633,340

(22) Filed: Aug. 4, 2000

(30) Foreign Application Priority Data

Aug. 4, 1999 (JP) .......................................... 11-220783

(51) Int. Cl.$^7$ .............................. G06K 9/00; G03F 3/08
(52) U.S. Cl. ...................... 382/162; 382/167; 358/518
(58) Field of Search ............................... 382/162, 165, 382/167; 358/1.9, 451, 500, 515, 517, 518, 520, 529, 530; 345/589

(56) References Cited

U.S. PATENT DOCUMENTS

| | | | | |
|---|---|---|---|---|
| 4,511,229 A | * | 4/1985 | Schwartz et al. ............ 396/225 |
| 4,972,257 A | * | 11/1990 | Birnbaum et al. ........... 358/520 |
| 5,311,332 A | * | 5/1994 | Imao et al. .................. 358/518 |
| 5,333,069 A | * | 7/1994 | Spence ........................ 358/517 |
| 5,357,354 A | * | 10/1994 | Matsunawa et al. ......... 358/530 |
| 6,172,681 B1 | * | 1/2001 | Ueda ........................... 345/589 |
| 6,172,776 B1 | * | 1/2001 | Murai et al. ................. 358/529 |
| 6,198,843 B1 | * | 3/2001 | Nakauchi et al. ............ 382/167 |
| RE37,940 E | * | 12/2002 | Imao et al. ................... 358/1.9 |

* cited by examiner

Primary Examiner—Andrew W. Johns
Assistant Examiner—Amir Alavi
(74) Attorney, Agent, or Firm—Sughrue Mion, PLLC (57) ABSTRACT

There are disclosed a color correcting relation extracting method capable of extracting a know-how of a color correction by an operator of a laboratory system, and a color correction method of reproducing the know-how. A color of an original image and a color of a transfer image formed in a laboratory system with a color correction of the original image by an operator are measured so that an LUT representative of the know-how of the color correction is extracted and incorporated into a computer system.

6 Claims, 9 Drawing Sheets

COLOR CORRECTING RELATION EXTRACTING METHOD AND COLOR CORRECTION METHOD

BACKGROUND OF THE INVENTION

1. Field of the Invention

The present invention relates to a color correcting relation extracting method for extracting an association relation among colors before and after color correction in the event that an original image is reproduced involving a color correction, and a color correction method for reproducing the color correction.

2. Description of the Related Art

In a technical field of printing, a photograph and the like, in the event that an original image on a reversal film is transferred onto a printing paper or a photographic paper to make a printed matter or a photograph, it often happens that an operator applies a color correction to form a high quality of image having the tone of a color, which is visually preferable for a person, on the printed matter or the photograph.

Hitherto, for forming such a high quality of image, there is use a specified system for producing a printed matter or a photograph to optimize the system in accordance with experience of an operator of the system.

For example, in case of the printing, when an original image on a reversal film is read by a scanner to derive image data, the image data is corrected through an operation of the scanner by the operator. An image is printed in accordance with the corrected image data, so that a preferable tone of color image is produced. At that time, a correction parameter for correcting the image data derived through the scanner is optimized in accordance with know-how based on the experience of an operator of the scanner, taking into consideration properties of the system in its entirety including printing papers, printing ink and the like. That is, a know-how of image formation, in which an image having a preferable tone of color is formed from an original image on a reversal film, is possessed by the operator of the scanner. Here, it is assumed that the operator of the scanner optimizes the correction parameter for a combination of a certain film and printing ink so that an image having a preferable tone of color is obtained. However, in the event that the film and/or the printing ink are replaced by other film and/or printing ink, the correction parameter will be changed to an inappropriate correction parameter. Thus, in this case, there is a need to optimize the correction parameter again.

On the other hand, in case of the photograph, a reversal film is loaded on a laboratory system and adjusted light for exposure is projected onto the loaded reversal film, so that a corrected image is obtained. The corrected image thus obtained is printed on a printing paper to form an image having a preferable tone of color. At that time, a balance among R light, G light and B light for the exposure and an exposure time are optimized by an operator of the laboratory system and an automatic control mechanism of the laboratory system, taking into consideration properties of the system in its entirety including films, a light source, printing papers and the like. Further, also with respect to a combination of a sort of a film and a sort of a printing paper, there is selected such an optimum combination that a preferable tone of color image can be obtained. That is, a know-how of image formation, in which an image having a preferable tone of color is formed, is possessed by the operator of the laboratory system, a maker of the laboratory system and a maker of the film. Here, it is assumed that an exposure time or the like is optimized for a combination of a certain film and a certain printing paper so that an image having a preferable tone of color is obtained. However, for example, in the event that the film is replaced by another film developed newly, the combination of the film and the printing paper and the exposure time will be inappropriate for the new film. Thus, also in this case, there is a need to optimize the exposure time and the like again.

Thus, in both the cases of the printing and the photograph, there is a need to do over again an optimization to form an image having a preferable tone of color, whenever a film and the like is replaced by a new type of one according to a development of products.

Further, recently, as digital technology advances, it is increased that a transfer of images is performed among different industries and media. For example, in the event that instead of distribution of printed papers, images of the printed matter appears in a home page of the internet, the image of the printed matter will be converted into an image of a television, which is not so related to the printing industry hitherto. Further, for example, it begins that one shot of an image photographed by a home video is printed out by a printer of a personal computer, or outputted on a printing paper for a photograph. In the event that such a transfer of images is performed, it is desired that a high quality of image having a preferable tone of color as mentioned above is obtained at the received end of the image. However, according to the prior art, the above-mentioned know-how is merely allowed to be used only in the individual industries such as the printing industry and the photographic industry, but is not allowed to be used in a different industry on a common basis.

SUMMARY OF THE INVENTION

In view of the foregoing, it is an object of the present invention to provide a color correcting relation extracting method capable of extracting the above-mentioned know-how, and a color correction method capable of reproducing the know-how.

To achieve the above-mentioned object, the present invention provides a color correcting relation extracting method comprising:

a measuring step of obtaining coordinate values of a colorimetry color space describing colorimetry values of a color, corresponding to a color of a reproduced image wherein an original image is formed with a color correction, through a measurement of the reproduced image; and an obtaining step of obtaining coordinate values of the colorimetry color space corresponding to a color of the original image, whereby an association between colors before and after the color correction is extracted.

Here, in the obtaining step, it is acceptable that colorimetry values are obtained through a colorimetry measurement of an original image, or alternatively an original image is written into a reversal film or the like in which a color characteristic is known beforehand, by means of a laser beam so as to offer a predetermined colorimetry values of color.

According to the color correcting relation extracting method of the present invention, coordinate values of the colorimetry color space corresponding to colors of the original image and the reproduced image are obtained. This feature makes it possible to extract a know-how of the color correction independent of a device for forming an original image.

In the color correcting relation extracting method according to the present, invention as mentioned above, it is acceptable that said measuring step includes a characteristic value measuring step of obtaining a characteristic value capable of being converted into the coordinate values of the colorimetry color space, corresponding to a color of the reproduced image, through measuring the reproduced image, and a first conversion step of converting the characteristic value obtained by the characteristic value measuring step into the coordinate values of the colorimetry color space.

Or alternatively, it is acceptable that said obtaining step includes a characteristic obtaining step of obtaining a characteristic values capable of being converted into the coordinate value of the colorimetry color space, corresponding to a color of the original image, and a second conversion step of converting the characteristic value obtained by the characteristic value obtaining step into the coordinate values of the colorimetry color space.

Colorimetry values of color of an image on a reversal film and a printing paper can be calculated in accordance with a characteristic value such as dye density of the reversal film or the like and a color characteristic of the reversal film or the like. Accordingly, it is possible to extract a know-how in form of device-independence in such a manner that dye density or the like of the original image and the reproduced image is derived and colorimetry values are computed from the dye density or the like thus obtained.

To achieve the above-mentioned object, the present invention provides a color correction method comprising:

- a color correction conversion definition producing step including a first partial step of obtaining a coordinate values of a colorimetry color space describing colorimetry values of a color, corresponding to a color of a reproduced image wherein an original image is formed with a color correction, through a measurement of the reproduced image, and a second partial step of obtaining coordinate values of the colorimetry color space corresponding to a color of the original image, whereby said color correction conversion definition producing step produces a color correction conversion definition defining an association between coordinate values of the colorimetry color space corresponding to colors before and after the color correction;
- a first device conversion step of using a conversion definition according to characteristics of image receipt or image output by a first device for receiving an image to obtain image data or outputting an image based on image data, to convert coordinate values in a first color space describing image data for the first device into coordinate values of the colorimetry color space independent of the device;
- a color correction conversion step of using the color correction conversion definition produced in said color correction conversion definition producing step to convert coordinate values of the colorimetry color space corresponding to a color before the color correction into coordinate values of the colorimetry color space corresponding to a color after the color correction; and
- a second device conversion step of using a conversion definition according to characteristics of image receipt or image output by a second device for receiving an image to obtain image data or outputting an image based on image data, to convert coordinate values of the colorimetry color space into coordinate values in a second color space describing image data for the second device, whereby the image data defined by the first color space is converted into image data defined by the second color space, said image data being representative of an image in which the color correction is applied to an image based on the image data defined by the first color space.

Here, it is acceptable that the respective steps of the first device conversion step, the color correction conversion step and the second device conversion step are sequentially carried out in the named order, or alternately they are carried out in form of a united conversion process in which those steps are united.

According to the color correction method according to the present invention, in the color correction conversion definition producing step, there is produced a color correction conversion definition corresponding to a know-how extracted independent of a device for forming an original. And in the image data conversion step, the color correction conversion definition is used to convert the image data. This feature makes it possible to reproduce the color correction regardless of the sort of a device for forming an original image.

In the color correction method according to the present invention as mentioned above, it is acceptable that said color correction conversion definition producing step produces, as said color correction conversion definition, a color correction conversion definition defining an association between coordinate values within an area of original image colors reproducible as colors of the original image of the colorimetry color space and coordinate values within an area of reproduced image colors reproducible as colors of the reproduced image of the colorimetry color space, before execution of the color correction conversion step, there is carried out a first gamut conversion step in which coordinate values within an area of colors reproducible as colors of an image received or outputted by the first device of the colorimetry color space are converted into coordinate values within an area of the original image colors, and after execution of the color correction conversion step, there is carried out a second gamut conversion step in which coordinate values within an area of the reproduced image colors are converted into coordinate values within an area of colors reproducible as colors of an image received or outputted by the second device of the colorimetry color space.

Or alternatively it is acceptable that said color correction conversion definition producing step produces, as said color correction conversion definition, a color correction conversion definition defining an association between coordinate values within a predetermined area of the colorimetry color space, before execution of the color correction conversion step, there is carried out a first gamut conversion step in which coordinate values within an area of colors reproducible as colors of an image received or outputted by the first device of the colorimetry color space are converted into the coordinate values within the predetermined area, and after execution of the color correction conversion step, there is carried out a second gamut conversion step in which the coordinate values within predetermined area are converted into coordinate values within an area of colors reproducible as colors of an image received or outputted by the second device of the colorimetry color space.

The adoption of the gamut conversion steps makes it possible to reproduce the know-how of the color correction so that the color reproducing ability of the first device and the second device are sufficiently derived.

DETAILED DESCRIPTION OF PREFERRED EMBODIMENTS

Embodiments of the present invention will be described with reference to the accompanying drawings.

Figure 1:
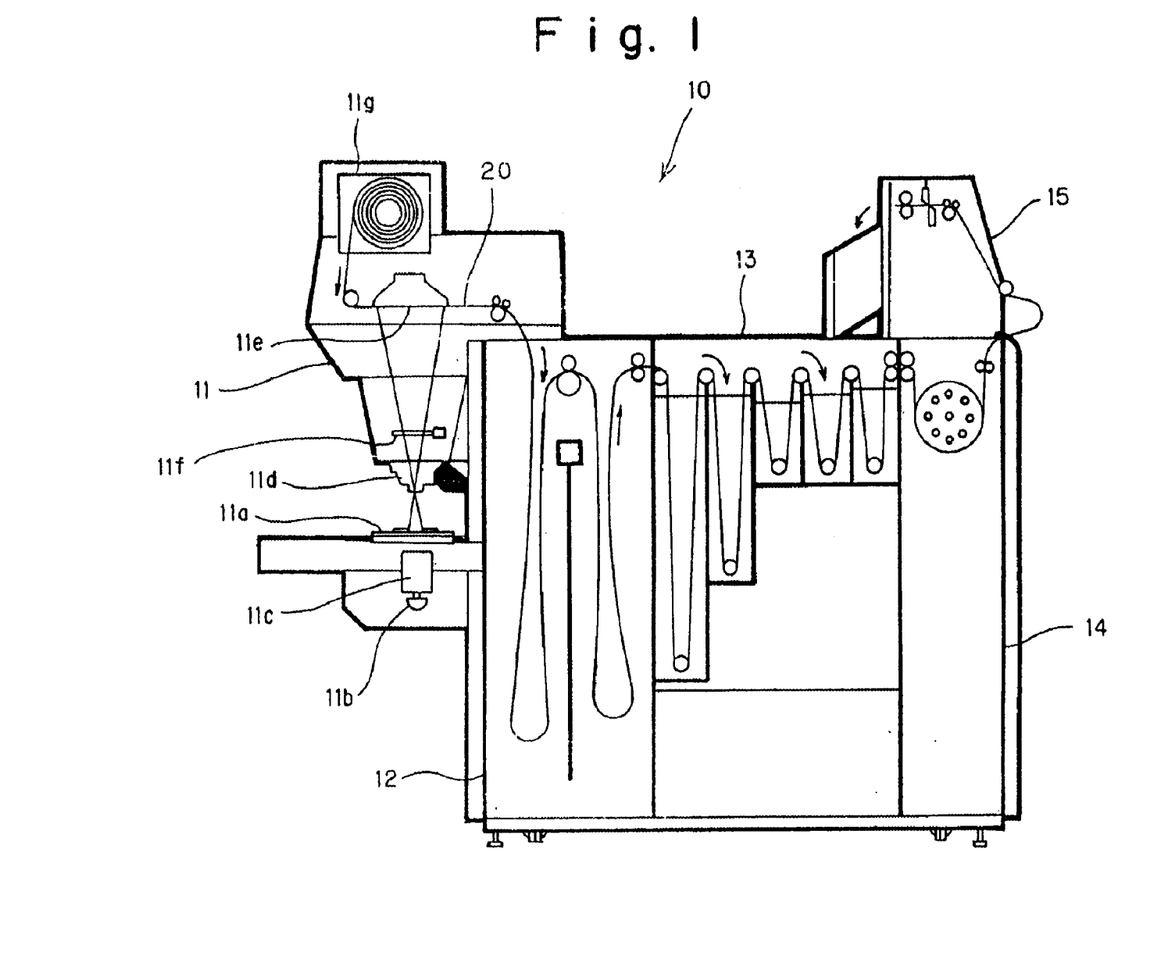
FIG. 1 is a view of a laboratory system, which is an example of a system wherein a color correcting relation extracting method according to the present invention is applied to extract a know-how of a color correction.

FIG. 1 is a view of a laboratory system, which is an example of a system wherein a color correcting relation extracting method according to the present invention is applied to extract a know-how of a color correction.

A film carrier 11a of a laboratory system 10 is loaded with a reversal film of a sort which is optimal in a combination with a sort of a printing paper 20. A light from a light source 11b is projected via a dimmer 11c onto the reversal film. The dimmer 11c incorporates thereinto three filters associated with R light, G light and B light, respectively. An operator of the laboratory system and an automatic control mechanism of the laboratory system controls a degree of each of the filters affecting on the light of the light source 11b so that a color balance and the like of the irradiation light are adjusted. An image on the reversal film irradiated by the irradiation light is formed by a lens 11d on an exposure stage 11e and a printing paper 20 is exposed. And the operator or the like controls a shutter time of a shutter 11f so that an exposure time is controlled.

A paper (printing paper) 20, which is loaded onto a paper magazine 11g of a print section 11, is exposed on the exposure stage 11e and is transferred to a reservoir section 12 in accordance with an instruction of the operator. The paper (printing paper) 20 transferred to the reservoir section 12 is transferred at a constant speed to a developing section 13 to be developed, and thereafter is dried in a drier section 14, and finally is cut into a predetermined size in a cutter section 15 to form a photograph.

According to an image on the photograph thus formed, a selection of a combination of a film and a printing paper, an adjustment of a filter, a control of an exposure time, and so forth are performed in accordance with the know-how which the operator and the maker obtained through their experiences as mentioned above. And as a result, there is formed a high quality of image having a tone of color which is visually preferable for a person.

Figure 2:
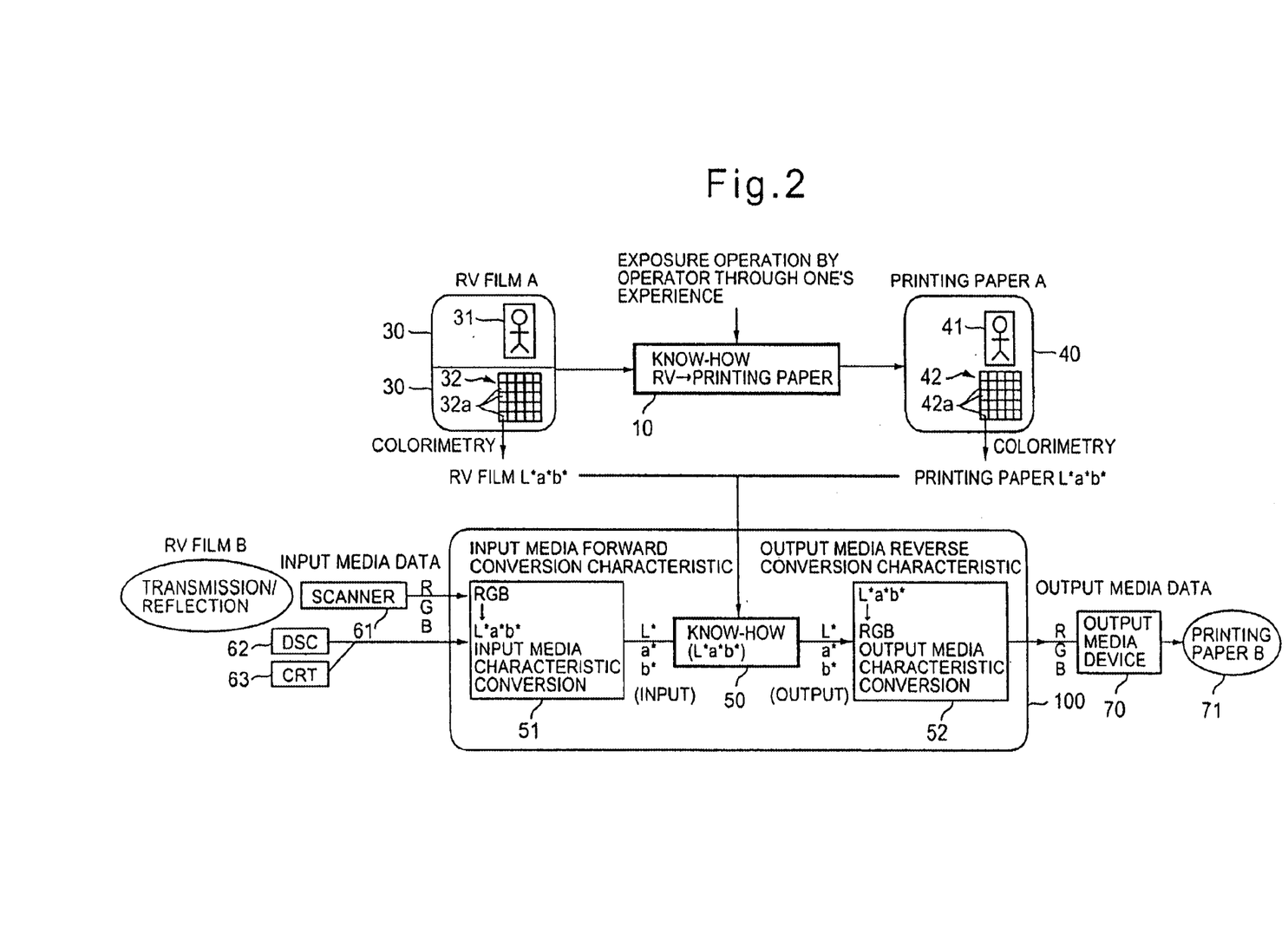
FIG. 2 is a view showing a first embodiment of a color correction method according to the present invention including a first embodiment of a color correcting relation extracting method according to the present invention.

FIG. 2 is a view showing a first embodiment of a color correction method according to the present invention including a first embodiment of a color correcting relation extracting method according to the present invention.

A first embodiment of a color correcting relation extracting method according to the present invention is related to a method of extracting a know-how for an image formation possessed by an operator of the laboratory system 10 and a film maker. A first embodiment of a color correction method according to the present invention is related to a method in which the know-how is extracted in accordance with the first embodiment of a color correcting relation extracting method and the extracted know-how is used to perform a color correction.

According to the first embodiment of a color correcting relation extracting method, first, a general image 31, such as a portrait image and a nature image, which is photographed on a reversal film 30 of a sort referred to as the "RV film A", is printed on a printing paper 40 of a sort referred to as the "printing paper A". At that time, the combination of the "RV film A" and the "printing paper A" is a combination which offers a preferable tone of color for an image. An operator of the laboratory system 10 controls an exposure amount and the like in such a manner that a tone of color of the image becomes a preferable tone of color.

Further, a reversal film 30, on which a color chart 32 consisting of a number of monochromatic patches 32a arranged on a two-dimensional basis is formed, is also loaded onto the laboratory system 10 in parallel to the reversal film 30 on which the general image 31 is formed, and the color chart 32 is also printed on a printing paper on the same exposure condition as that when the general image 31 is printed on the printing paper 40. The printing paper 40 on which the general image 31 and the color chart 32 are printed is developed so that a photograph on which a general image 41 and a color chart 42 are formed is obtained.

Next, a color of each of the patches 32a constituting the color chart 32 formed on the reversal film 30 and a color of each of the patches 42a constituting the color chart 42 formed on the photograph 40 are measured by a colorimeter to derive a measured value corresponding to a coordinate value of a color space on a color of each of the patches 32a and 42a. As the measured value, CIEXYZ values, CIELUV values $L^*u^*v^*$, and CIELAB values $L^*a^*b^*$ may be considered. Here, it is assumed that the CIELAB values $L^*a^*b^*$ are derived. Hereinafter, the CIELAB values $L^*a^*b^*$ are summarized as Lab. Further, in some case, it happens that the CIELAB values $L^*a^*b^*$ are referred to as a coordinate value of a CIELAB color space.

After derivation of each Lab through the measurement of a color of each of the patches 32a and 42a, there is generated a Look Up Table (LUT) 50 for establishing an association of the Lab of each of the patches 32a on the reversal film 30 with the Lab of each of the patches 42a on the photograph 40. The LUT 50 thus generated is incorporated into a computer system 100.

The LUT 50 thus generated offers a know-how for a color correction with which an image having a preferable tone of color can be obtained. This is an example of a definition of a color correction conversion referred to in the present invention. The generation of the LUT 50 makes it possible to extract the know-how regardless of types of the laboratory system 10, the reversal film 30, the printing paper 40 and so on.

In the event that the know-how is incorporated into the computer system 100, it is not always required to incorporate the know-how into the computer system 100 using the LUT. Any one is acceptable, as the LUT, which defines a conversion corresponding to the know-how, for example, a function equation and a matrix. Hereinafter, the explanation will be continued assuming that the LUT is used to incorporate the know-how into the computer system 100.

According to the first embodiment of the color correction method, as mentioned above, after the LUT 50 is generated and incorporated into the computer system 100, the computer system 100 receives input media data derived through reading by a scanner 61 an image formed on an input media such as a reversal film of a sort referred to an "RV film B" for example, and a reflection print (for example a photograph), input media data representative of a color of an image photographed by a digital still camera 62, and input media data representative of a color of an image produced and edited on a CRT display 63. As a format of the input media data, there may be considered CMY data and RGB data. Here it is assumed that RGB data is inputted.

Next, there is performed an input media characteristic conversion in which entered RGB data is converted into coordinate values Lab (Input) of the CIELAB color space corresponding to the color of the image on the input media. The input media characteristic conversion is defined by an input media characteristic conversion definition 51 based on characteristics of a device associated with the entered RGB data.

Then, the LUT 50 converts the coordinate values Lab (Input) to coordinate values Lab (Output) corresponding to a preferable tone of color.

Finally, the coordinate values Lab (Output) derived through conversion by the LUT 50 are converted into the RGB data for an output device 70 such as a digital printer in accordance with an output media characteristic conversion defined by an output media characteristic conversion definition 52 based on output characteristics of the output device 70. The output device 70 outputs an image to an output media 71 such as a printing paper of a sort referred to as, for example, a "printing paper B". Here, as the output media 71, other than the printing paper, there are considered a printed matter, a CRT display and a reversal film. It is acceptable that the color correction method according to the present invention is used, for example, to convert image data derived through a scanner into a format of image data derived through a digital camera for the purpose of utility for an establishment of a home page of an internet.

When the RGB data thus outputted is fed to the output device 70, an image having a preferable tone of color is produced on the output media 71. The know-how for a color correction to obtain an image having such a preferable tone of color may be reproduced regardless of input and output characteristics of the input devices 61, 62 and 63 and the output device 70. In other words, it is possible to implement a wide use of color correction system independent of the input devices and the output device.

Figure 3:
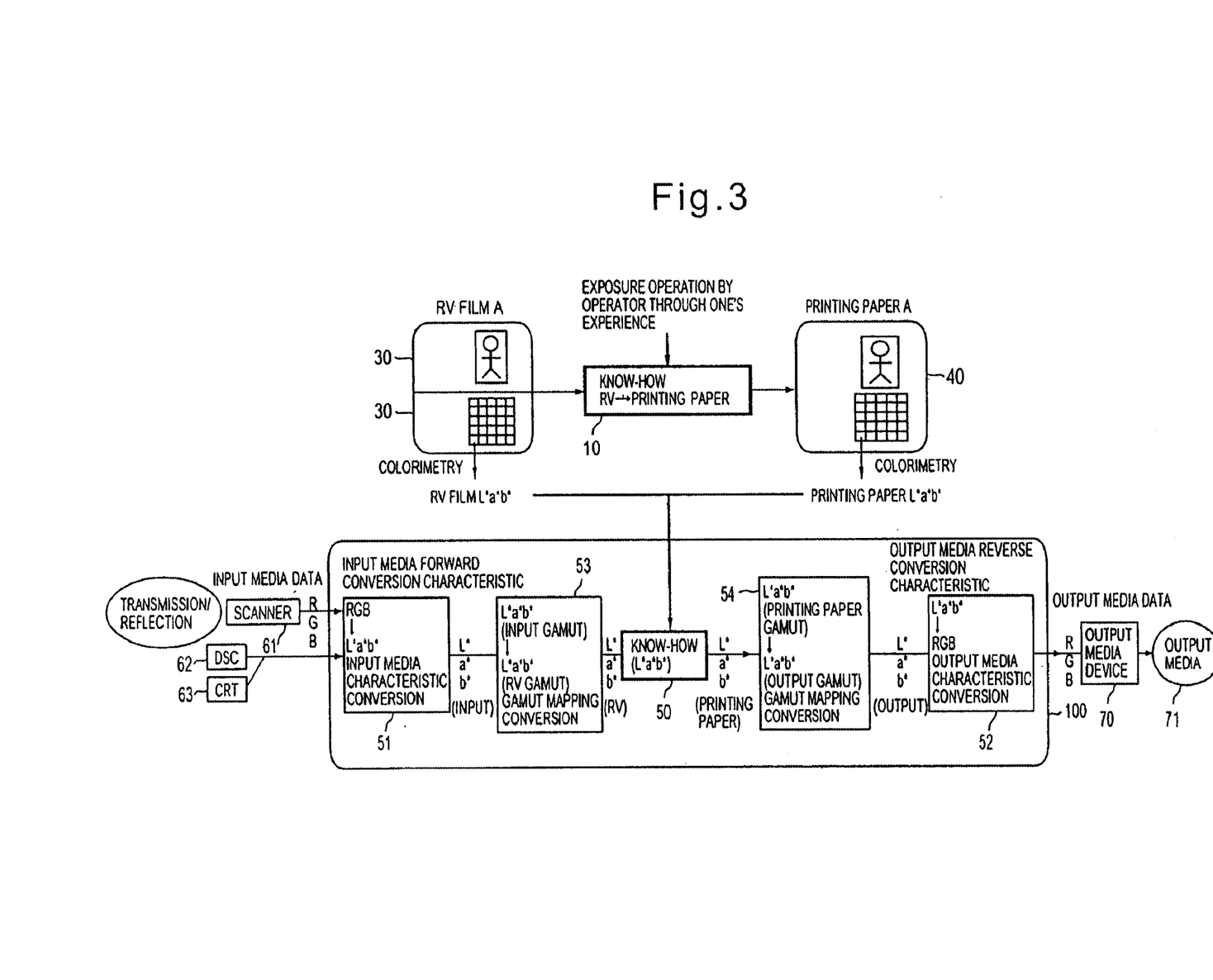
FIG. 3 is a view showing a second embodiment of a color correction method according to the present invention including a first embodiment of a color correcting relation extracting method according to the present invention.

FIG. 3 is a view showing a second embodiment of a color correction method according to the present invention including a first embodiment of a color correcting relation extracting method according to the present invention.

With respect to the first embodiment of a color correcting relation extracting method according to the present invention, the redundant description will be omitted.

Also in the second embodiment of a color correction method, as mentioned above, after the LUT 50 is produced and incorporated into the computer system 100, input media data (RGB data) for the input devices 61, 62 and 63 are inputted to the computer system 100. And the RGB data fed to the computer system 100 is converted into coordinate values Lab (Input) of the CIELAB color space corresponding to the color of the image on the input media in accordance with the input media characteristic conversion defined by the above-mentioned input media characteristic conversion definition 51 based on characteristics of the device associated with the entered RGB data.

By the way, the coordinate values Lab (Input) are coordinate values within a color reproducing area of the input devices 61, 62 and 63 associated with the RGB data on the CIELAB color space fed to the computer system 100. On the other hand, the LUT 50 incorporated into the computer system 100 is produced by the above-mentioned first embodiment of a color correcting relation extracting method. Accordingly, the LUT 50 is to associate the coordinate value within a color reproducing area of the reversal film 30 with the coordinate value within a color reproducing area of the printing paper 40. For this reason, in the event that the coordinate values Lab (Input) are converted by the LUT 50 in the present form, there is a possibility of occurrence of such an inconvenience that the know-how for the color correction is not reproduced, owing to the fact that the color reproducing area of the input devices 61, 62 and 63 is different from the color reproducing area of the reversal film 30.

For this reason, according to the second embodiment of a color correction method, there is performed a gamut mapping conversion in which a coordinate value within a certain color reproducing area (gamut) is converted into a coordinate value within another color reproducing area (gamut), in a state that an impression of a color of an image is maintained. The gamut mapping conversion is a reversible conversion and also a conversion that two color reproducing areas are associated with one another in their entirety. The computer system 100 incorporates thereinto a LUT type of gamut conversion definition defining the gamut mapping conversion.

The coordinate values Lab (Input) obtained through the above-mentioned input media characteristic conversion is subjected to a gamut mapping conversion in which coordinate values Lab (Input) within a color reproducing area of the input device are converted into coordinate values Lab (RV) within a color reproducing area of the reversal film 30. The gamut mapping conversion is defined by a gamut conversion definition 53. Thus, it is possible to avoid an inconvenience due to a difference between the color reproducing area of the input devices 61, 62 and 63 and the color reproducing area of the reversal film 30.

Next, the coordinate values Lab (RV) within a color reproducing area of the reversal film 30 are converted by the LUT 50 into the coordinate values Lab (printing paper) within a color reproducing area of the printing paper (photograph) 40, which corresponds to a preferable tone of color.

Next, in a similar reason to that of the adoption of the gamut mapping conversion defined by the gamut conversion definition 53, there is performed a gamut mapping conversion in which coordinate values Lab (printing paper) within a color reproducing area of the printing paper 40 are converted into coordinate values Lab (Output) within a color reproducing area of the output device 70. This gamut mapping conversion is defined by a gamut conversion definition 54.

Finally, the coordinate values Lab (Output) are converted into the RGB data for the output device 70 in accordance with an output media characteristic conversion defined by the output media characteristic conversion definition 52.

Figure 4:
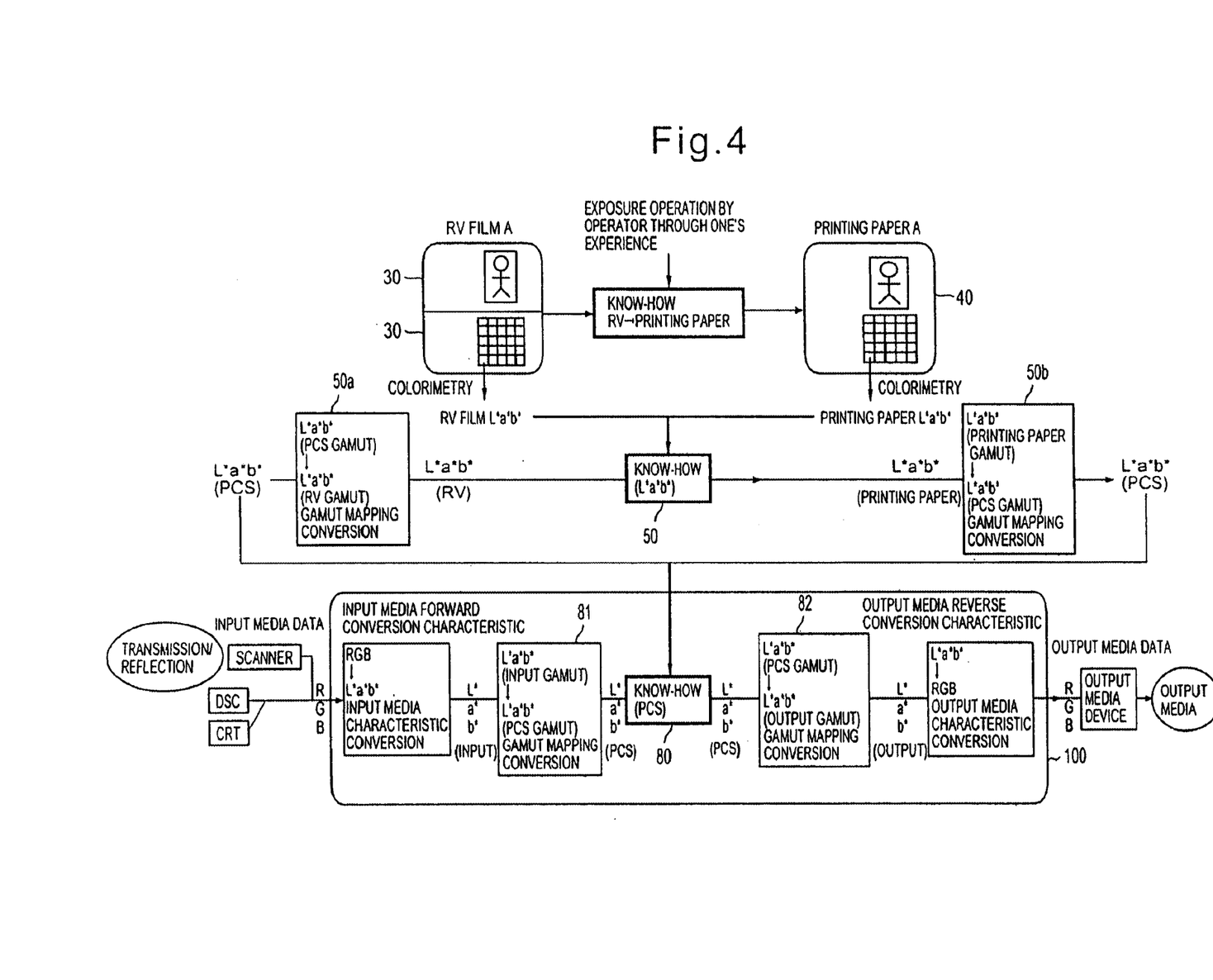
FIG. 4 is a view showing a third embodiment of a color correction method according to the present invention including a first embodiment of a color correcting relation extracting method according to the present invention.

FIG. 4 is a view showing a third embodiment of a color correction method according to the present invention including a first embodiment of a color correcting relation extracting method according to the present invention.

With respect to the first embodiment of a color correcting relation extracting method according to the present invention, the redundant description will be omitted.

As mentioned above, the LUT 50, which is produced in accordance with first embodiment of a color correcting relation extracting method, serves to associate the coordinate value within a color reproducing area of the reversal film 30 with the coordinate value within a color reproducing area of the printing paper 40. And in the event that the LUT 50 is incorporated into the computer system 100 to be used for a color correction, as mentioned above, there is a need to prepare the gamut mapping conversion based on the color reproducing area of the reversal film 30 and the color reproducing area of the printing paper 40.

However, in the event that it is aimed to establish a wide use of color correction system independent of the input devices and the output device, the process of the gamut mapping conversion based on the color reproducing area of the specific media such as the reversal film 30 may bring about a fear that it would be an obstacle of a wide use of the system.

In view of the foregoing, according to the third embodiment of a color correction method, the LUT 50, which associates the coordinate value within a color reproducing area of the reversal film 30 with the coordinate value within a color reproducing area of the printing paper 40, is modified to produce a LUT which associates coordinate values within a standard color reproducing area PCS with one another. The modified LUT is incorporated into the computer system 100. That is, an LUT 80, which corresponds to such a series of conversions that before the conversion by the LUT 50, a gamut mapping conversion 50*a*, in which a coordinate value within the standard color reproducing area PCS is converted into a coordinate value within the color reproducing area of the reversal film 30, is applied, and after the conversion by the LUT 50, a gamut mapping conversion 50*b*, in which a coordinate value within the color reproducing area of the printing paper 40 is converted into a coordinate value within the standard color reproducing area PCS, is applied, is produced and incorporated into the computer system 100.

After the LUT 80 is incorporated into the computer system 100, a color correction is performed in an approximately similar way to the above-mentioned second embodiment of the color correction method. According to the third embodiment of the color correction method, instead of the gamut mapping conversions defined by the gamut conversion definitions 53 and 54 in the above-mentioned second embodiment of the color correction method, there are performed a gamut mapping conversion defined by the gamut conversion definition 81 wherein coordinate values Lab (Input) within the color reproducing area of the input device are converted into coordinate values Lab (PCS) within the standard color reproducing area PCS, and a gamut mapping conversion defined by the gamut conversion definition 82 wherein coordinate values Lab (PCS) within the standard color reproducing area PCS are converted into coordinate values Lab (Output) within the color reproducing area of the output device.

As a result, it is possible to implement a color correction system excellent in a wide use property.

Figure 5:
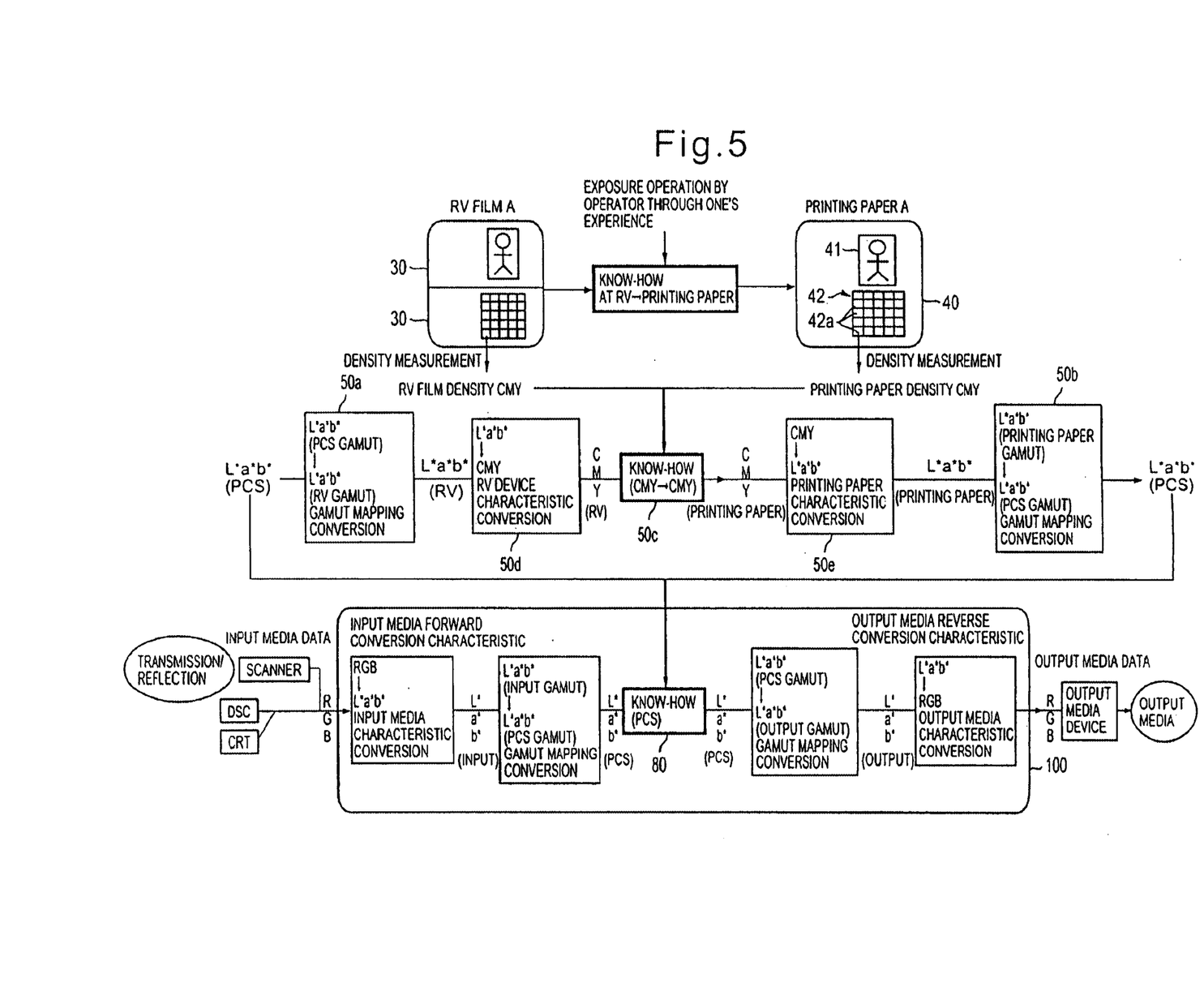
FIG. 5 is a view showing a fourth embodiment of a color correction method according to the present invention including a second embodiment of a color correcting relation extracting method according to the present invention, instead of the first embodiment of a color correcting relation extracting method according to the present invention.

FIG. 5 is a view showing a fourth embodiment of a color correction method according to the present invention including a second embodiment of a color correcting relation extracting method according to the present invention, instead of the first embodiment of a color correcting relation extracting method according to the present invention.

According to the second embodiment of a color correcting relation extracting method, first, in a similar fashion to that of the first embodiment of a color correcting relation extracting method, the laboratory system 10 shown in FIG. 1 prints, on the printing paper 40 of a sort referred to as the "printing paper A", the general image 31 which is photographed on a reversal film 30 of a sort referred to as the "RV film A", and the color chart 32 so that a photograph 40, on which a general image 41 having a preferable tone of color and a color chart 42 are photographed, is obtained.

Next, there are measured dye density CMY of each of patches 32*a* constituting the color chart 32 photographed on the reversal film 30, and dye density CMY of each of patches 42*a* constituting the color chart 42 photographed on the photograph 40, so that an association 50*c* between the respective dye densities CMY before and after the color correction is obtained.

The association 50*c* corresponds to one in which know-how of an operator of the laboratory system 10 and film makers is extracted, but depends on the color characteristic of the reversal film 30 and the color characteristic of the printing paper (photograph) 40. For this reason, according to the present embodiment, there are combined an RV device characteristic conversion 50*d* in which coordinate values Lab (RV) corresponding to a color of an image on the reversal film 30 are converted into dye density CMY (RV) of the reversal film 30, a know-how 50*c* in which the dye density CMY (RV) of the reversal film 30 is converted into dye density CMY (printing paper) of the printing paper 40, and a printing paper characteristic conversion 50*e* in which the dye density CMY (printing paper) of the printing paper 40 is converted into coordinate values Lab (RV) corresponding to a color of an image on the printing paper 40, so that a know-how, which is independent of the color characteristics of the reversal film 30 and the like, can be obtained.

The combination of the RV device characteristic conversion 50*d*, the know-how 50*c* and the printing paper characteristic conversion 50*e* is implemented in such a manner that the dye densities obtained through a measurement of the patches 32*a* and 42*a* are converted into coordinate values of color spaces corresponding to the colors of the patches 32*a* and 42*a* so that the association among the coordinate values is obtained.

The LUT 80 is produced in such a manner that the know-how independent of the color characteristics of the reversal film 30 and the like, which is extracted in accordance with the second embodiment of a color correcting relation extracting method, is corrected using the above-mentioned gamut mapping conversions 50*a* and 50*b*. The LUT 80 thus produced is incorporated into the computer system 100. With respect to the subsequent color correction procedure, the redundant description will be omitted.

Figure 6:
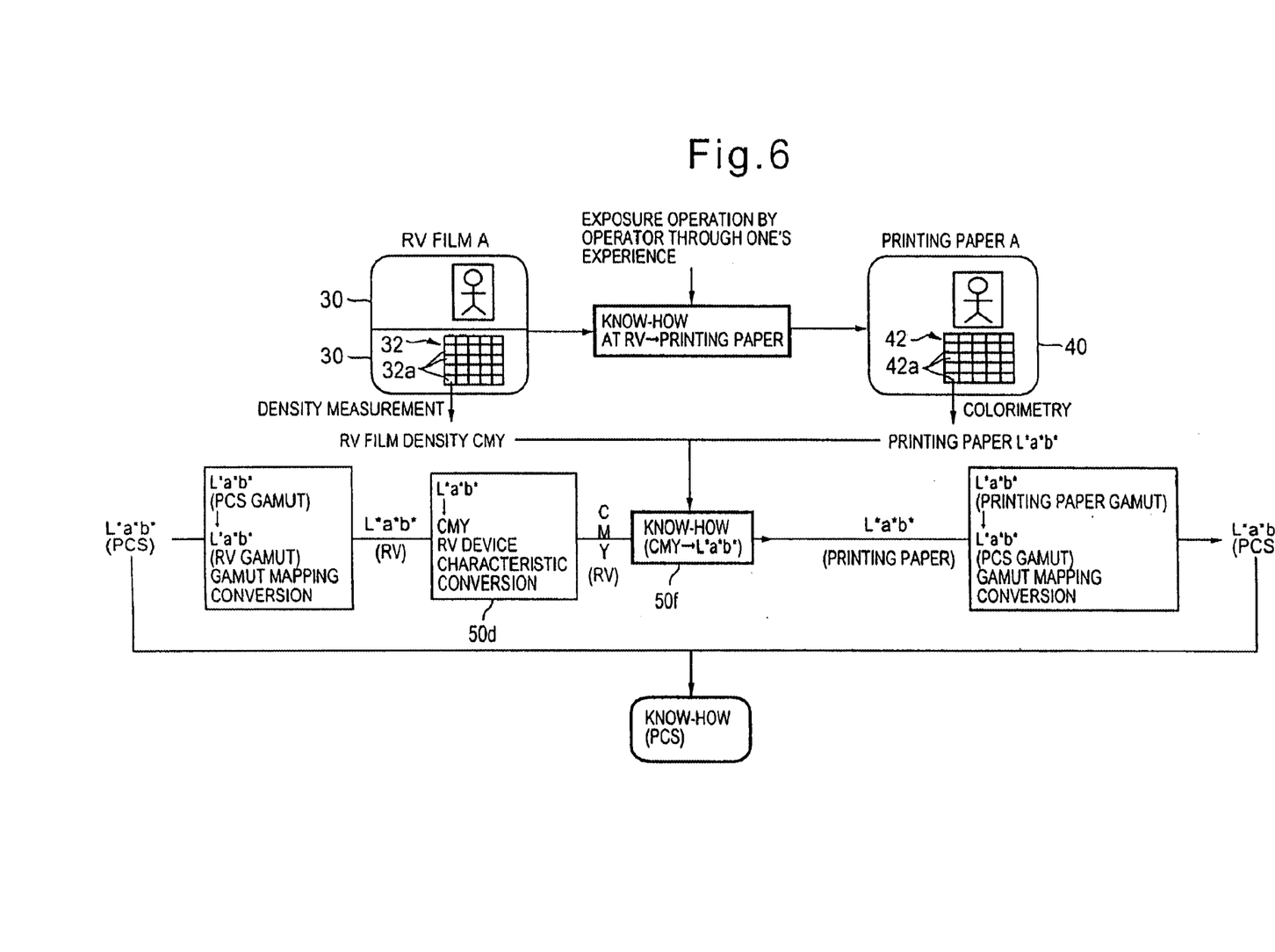
FIG. 6 is a view showing a third embodiment of a color correcting relation extracting method according to the present invention.

FIG. 6 is a view showing a third embodiment of a color correcting relation extracting method according to the present invention.

According to the third embodiment of a color correcting relation extracting method, regarding each of the patches 32*a* of the color chart 32 on the reversal film 30, the dye density CMY is measured in a similar fashion of the second embodiment of a color correcting relation extracting method, and regarding each of the patches 42*a* of the color chart 42 on the photograph 40, the colorimetry is performed in a similar fashion of the first embodiment of a color correcting relation extracting method so that the coordinate values Lab of the color space are obtained. A know-how 50*f* for converting the dye density CMY (RV) of the reversal film 30 into the coordinate values Lab (printing paper) corresponding to the color of the image of the photograph (printing paper) 40 is coupled with the above-mentioned RV device characteristic conversion 50*d*, so that a know-how, which is independent of the color characteristics of the reversal film 30 and the like, is obtained.

The subsequent procedure is the same as that explained referring to FIG. 4, and the redundant description will be omitted.

Figure 7:
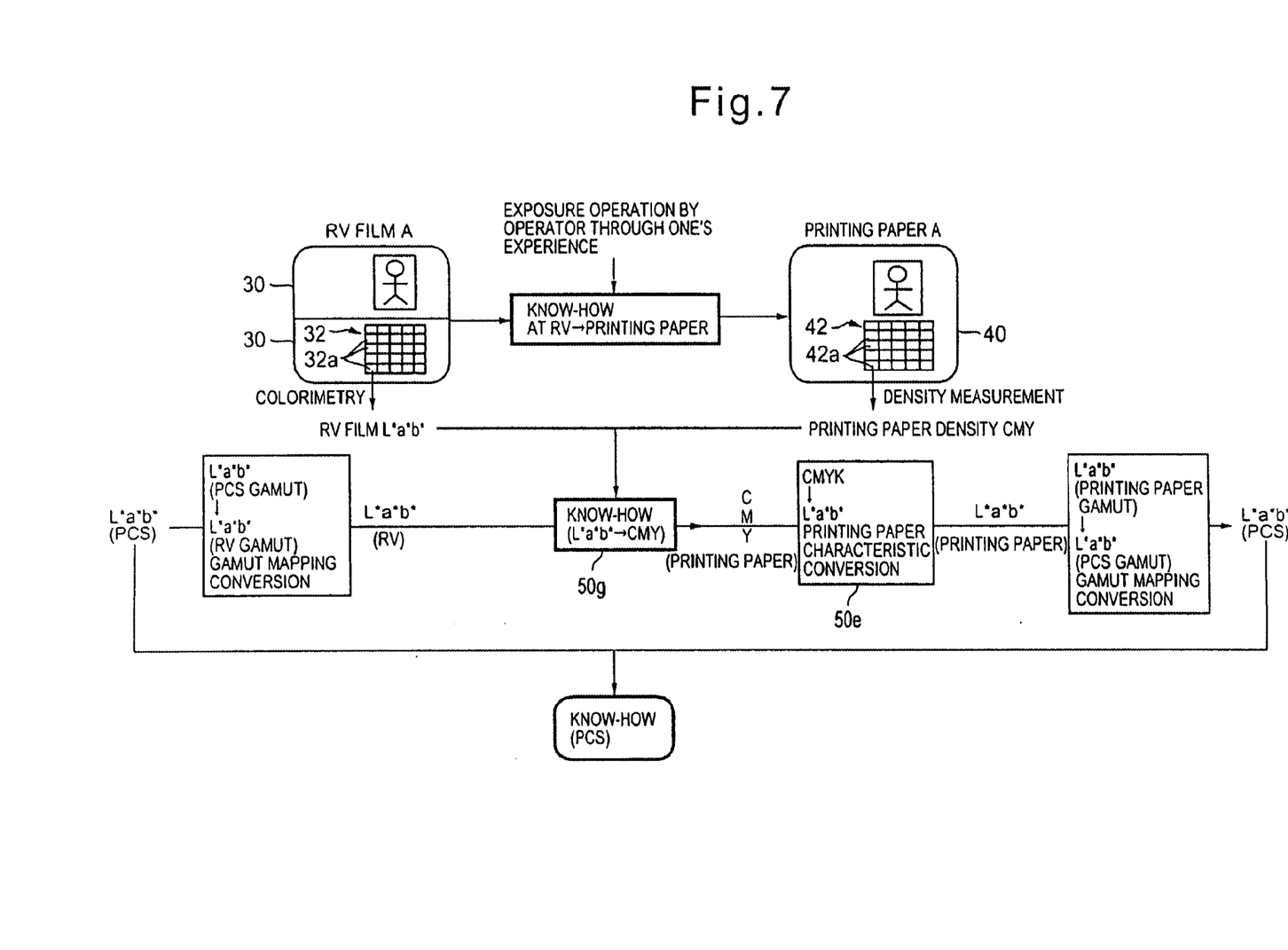
FIG. 7 is a view showing a fourth embodiment of a color correcting relation extracting method according to the present invention.

FIG. 7 is a view showing a fourth embodiment of a color correcting relation extracting method according to the present invention.

According to the fourth embodiment of a color correcting relation extracting method, regarding each of the patches 32*a* of the color chart 32 on the reversal film 30, the colorimetry is performed in a similar fashion of the first embodiment of a color correcting relation extracting method so that the coordinate values Lab of the color space are obtained, and regarding each of the patches 42*a* of the color chart 42 on the photograph 40, the dye density CMY is measured in a similar fashion of the second embodiment of a color correcting relation extracting method. A know-how 50*g* for converting the coordinate values Lab (RV) corresponding to the color on the reversal film 30 into the dyne density CMY (printing paper) of the photograph (printing paper) 40 is coupled with the above-mentioned printing paper characteristic conversion 50*e*, so that a know-how, which is independent of the color characteristics of the printing paper 40 and the like, is obtained. With respect to the subsequent procedure, the redundant description will be omitted.

Figure 8:
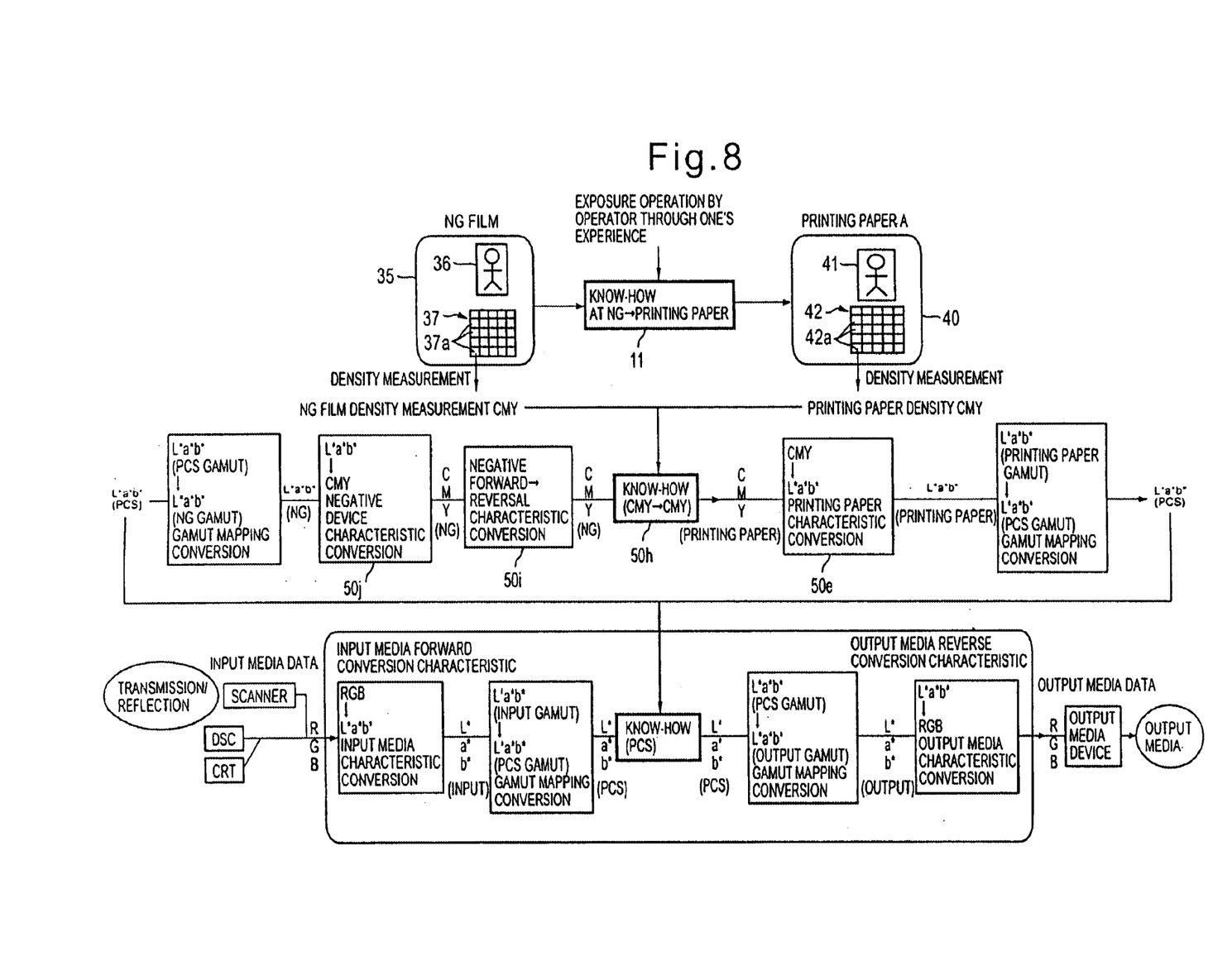
FIG. 8 is a view showing a fifth embodiment of a color correcting relation extracting method according to the present invention.

FIG. 8 is a view showing a fifth embodiment of a color correcting relation extracting method according to the present invention.

According to the fifth embodiment of a color correcting relation extracting method, first, a negative film 35, on which a general image 36 and a color chart 37 are formed, is loaded on a laboratory system 11, so that a photograph, on which a general image 41 and a color chart 42 are formed, is obtained. Also here, a combination of a sort of the negative film 35 and a sort of a printing paper 40 is optimized, and an operator and the like of the laboratory system performs an exposure operation in accordance with a know-how. As a result, a general image 41 on the photograph 40 is an image having a preferable tone of color.

Next, in a similar fashion to that of the second embodiment of a color correcting relation extracting method explained referring to FIG. 5, dye density of each of patches 37*a* constituting the color chart 37 formed on the negative film 35 and dye density CMY of each of patches 42*a* constituting the color chart 42 formed on the photograph 40 are measured.

And there are combined a know-how 50*h* in which dye density CMY (NG) of the negative film 35 is converted into dye density CMY (printing paper) of the printing paper 40, a forward/reverse characteristic conversion 50*i* in which an image on the negative film 35 is converted from a forward image to a reverse image, and a negative film device characteristic conversion 50*j* in which coordinate values Lab (NG) corresponding to a color of an image on the negative film 35 are converted into the dye density CMY (NG) of the negative film 35, so that a know-how, which is independent of the color characteristics of the negative film 35 and the like can be obtained. With respect to the subsequent procedure, the redundant description will be omitted.

Figure 9:
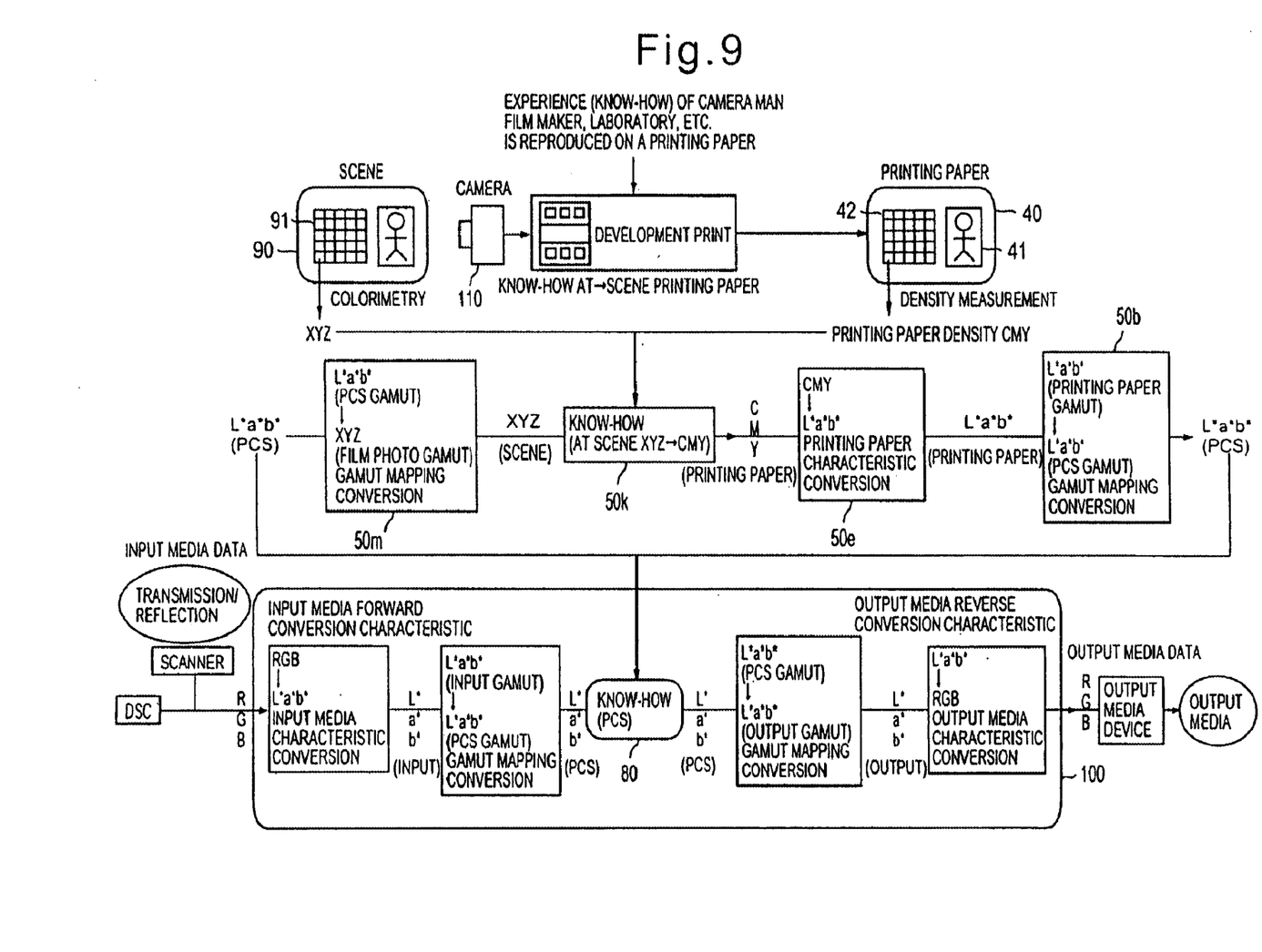
FIG. 9 is a view showing a sixth embodiment of a color correcting relation extracting method according to the present invention.

FIG. 9 is a view showing a sixth embodiment of a color correcting relation extracting method according to the present invention.

According to the sixth embodiment of a color correcting relation extracting method, first, a scene 90 such as a person and a landscape is photographed by a camera 110. In addition, on the same condition, a scene 90 including a color chart is photographed. A film, which is subjected to a photography by the camera 110, is developed and printed on a printing paper 40 to obtain a photograph on which a general image 41 and a color chart 42 are formed. The image on the photograph 40 thus obtained reflects a know-how of a camera man who photographed the scene by the camera 110, a know-how of a maker of the film used in the photograph, and a know-how of an operator of the laboratory for the development and the printing. Thus, the general image 41 formed on the photograph is an image having a preferable tone of color.

Next, a color of each of patches of a color chart 91 in a scene is measured to derive a CIEXYZ value XYZ, while dye density CMY of the patch of the color chart on the photograph (printing paper) 40 is measured. Thus, it is possible to obtain a know-how 50*k* for converting the CIEXYZ value XYZ (scene) of the color of the scene into the dye density CMY of the photograph (printing paper) 40. The know-how 50*k* thus obtained is combined with the above-mentioned printing paper characteristic conversion 50*e* to obtain a know-how which is independent of the color characteristics of the printing paper 40.

Thereafter, a gamut mapping conversion 50*m*, in which coordinate values Lab (PCS) within the standard color reproducing area are converted into the CIEXYZ value XYZ (scene) within the color reproducing area of the photography scene, and the gamut mapping conversion 50*b*, which is explained referring to FIG. 4, are used to modify the know-how so that LUT 80 representative of the color correction within the standard color reproducing area is produced. The LUT 80 thus produced is incorporated into the computer system 100. With respect to the subsequent procedure, the redundant explanation will be omitted.

As mentioned above, according to a color correcting relation extracting method of the present invention, it is possible to extract the above-mentioned know-how. And according to a color correction method of the present invention, it is possible to reproduce the know-how.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A color correcting relation extracting method comprising:

a measuring step of obtaining coordinate values of a colorimetry color space describing a colorimetry values of a color, corresponding to a color of a reproduced image wherein an original image is formed with a color correction, through a measurement of the reproduced image; and an obtaining step of obtaining coordinate values of the colorimetry color space corresponding to a color of the original image, whereby an association between colors before and after the color correction is extracted.

2. A color correcting relation extracting method according to claim 1, wherein said measuring step includes a characteristic value measuring step of obtaining a characteristic value capable of being converted into the coordinate values of the colorimetry color space, corresponding to a color of the reproduced image, through measuring the reproduced image, and a first conversion step of converting the characteristic value obtained by the characteristic value measuring step into the coordinate values of the colorimetry color space.

3. A color correcting relation extracting method according to claim 1, wherein said obtaining step includes a characteristic obtaining step of obtaining a characteristic value capable of being converted into the coordinate values of the colorimetry color space, corresponding to a color of the original image, and a second conversion step of converting the characteristic value obtained by the characteristic value obtaining step into the coordinate values of the colorimetry color space.

4. A color correction method comprising:

a color correction conversion definition producing step including a first partial step of obtaining coordinate values of a colorimetry color space describing colorimetry values of a color, corresponding to a color of a reproduced image wherein an original image is formed with a color correction, through a measurement of the reproduced image, and a second partial step of obtaining coordinate values of the colorimetry color space corresponding to a color of the original image, whereby said color correction conversion definition producing step produces a color correction conversion definition defining an association between coordinate values of the colorimetry color space corresponding to colors before and after the color correction;

a first device conversion step of using a conversion definition according to characteristics of image receipt or image output by a first device for receiving an image to obtain image data or outputting an image based on image data, to convert coordinate values in a first color space describing image data for the first device into coordinate values of the colorimetry color space independent of the device;

a color correction conversion step of using the color correction conversion definition produced in said color correction conversion definition producing step to convert coordinate values of the colorimetry color space corresponding to a color before the color correction into coordinate values of the colorimetry color space corresponding to a color after the color correction; and a second device conversion step of using a conversion definition according to characteristics of image receipt or image output by a second device for receiving an image to obtain image data or outputting an image based on image data, to convert coordinate values of the colorimetry color space into coordinate values in a second color space describing image data for the second device, whereby the image data defined by the first color space is converted into image data defined by the second color space, said image data being representative of an image in which the color correction is applied to an image based on the image data defined by the first color space.

5. A color correction method according to claim 4, wherein said color correction conversion definition producing step produces, as said color correction conversion definition, a color correction conversion definition defining an association between coordinate values within an area of original image colors reproducible as colors of the original image of the colorimetry color space and coordinate values within an area of reproduced image colors reproducible as colors of the reproduced image of the colorimetry color space, before execution of the color correction conversion step, there is carried out a first gamut conversion step in which coordinate values within an area of colors reproducible as colors of an image received or outputted by the first device of the colorimetry color space is converted into coordinate values within an area of the original image colors, and after execution of the color correction conversion step, there is carried out a second gamut conversion step in which coordinate values within an area of the reproduced image colors are converted into coordinate values within an area of colors reproducible as colors of an image received or outputted by the second device of the colorimetry color space.

6. A color correction method according to claim 4, wherein said color correction conversion definition producing step produces, as said color correction conversion definition, a color correction conversion definition defining an association between coordinate values within a predetermined area of the colorimetry color space, before execution of the color correction conversion step, there is carried out a first gamut conversion step in which coordinate values within an area of colors reproducible as colors of an image received or outputted by the first device of the colorimetry color space are converted into the coordinate values within the predetermined area, and after execution of the color correction conversion step, there is carried out a second gamut conversion step in which the coordinate values within predetermined area are converted into coordinate values within an area of colors reproducible as colors of an image received or outputted by the second device of the colorimetry color space.

* * * * *